United States Patent [19]

Schenck

[11] 4,337,988
[45] Jul. 6, 1982

[54] MODULAR FURNITURE SYSTEM

[75] Inventor: Robert Schenck, Mishicot, Wis.

[73] Assignee: Curtin Matheson Scientific, Inc., Houston, Tex.

[21] Appl. No.: 131,032

[22] Filed: Mar. 17, 1980

[51] Int. Cl.³ .................. A47B 87/00; A47B 91/00
[52] U.S. Cl. .............................. 312/250; 312/201; 312/278; 297/140
[58] Field of Search ............ 312/250, 201, 278, 327, 312/209; 5/2 R; 297/140, 143; 292/DIG. 15

[56] References Cited

U.S. PATENT DOCUMENTS

| 376,070 | 1/1888 | Cobb et al. | 312/250 |
|---|---|---|---|
| 1,038,111 | 9/1912 | Foss | 292/DIG. 15 |
| 3,055,017 | 9/1962 | Thierfelder | 5/2 R |
| 3,356,434 | 12/1967 | Theodores | 312/250 |
| 3,482,894 | 12/1969 | Pryor | 312/209 |
| 3,537,769 | 11/1970 | Carlo | 312/250 |
| 3,656,587 | 4/1972 | Siegel | 312/250 |
| 3,752,550 | 8/1973 | Niemeyer | 312/250 |
| 3,900,905 | 8/1975 | Johnson et al. | 5/2 R |
| 3,967,868 | 7/1976 | Baker, Jr. | 312/250 |
| 4,026,616 | 5/1977 | Kuehl | 312/278 |

Primary Examiner—Victor N. Sakran
Attorney, Agent, or Firm—Silverman, Cass & Singer, Ltd.

[57] ABSTRACT

Mobile furniture modules can be releasably installed under a work surface structure, such as provided by a countertop or table top, with convenient rearrangement enabled by providing each module with roller structures, such as typical casters, which are releasably anchored in wheel mounts which receive the caster wheels in a depression seat at a level elevated from the floor in the installed position. In addition the work surface structure is provided with a retainer which prevents movement of installed modules from beneath the work surface structure, preferably by engaging the top of the module with adjustable elevation which levels the module following releasable anchoring of the wheels in the elevated depression seat.

The modular furniture system can be employed with particular advantage for movable laboratory cabinets to provide continuous work surface between rearrangeably installed cabinets.

3 Claims, 3 Drawing Figures

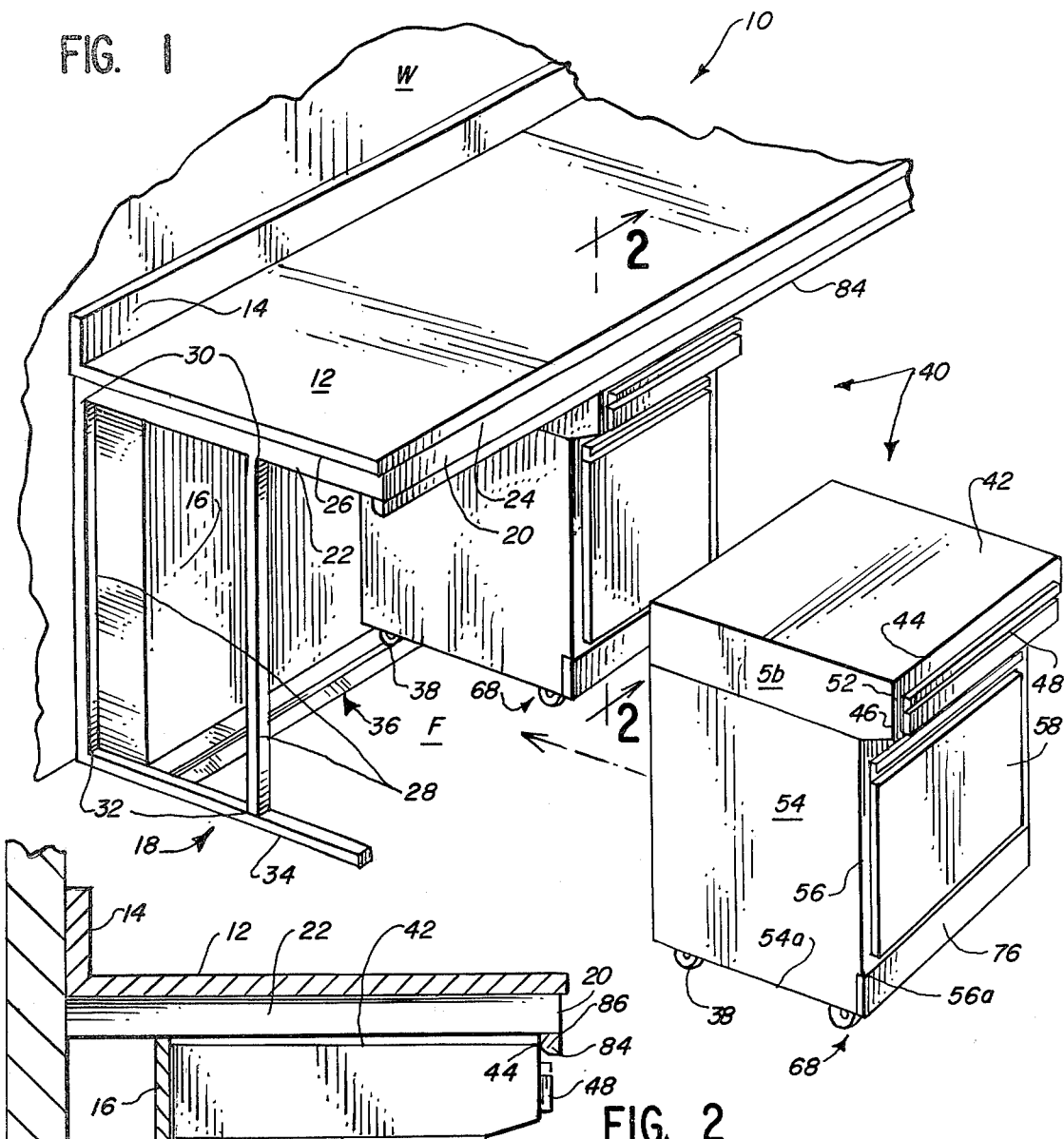
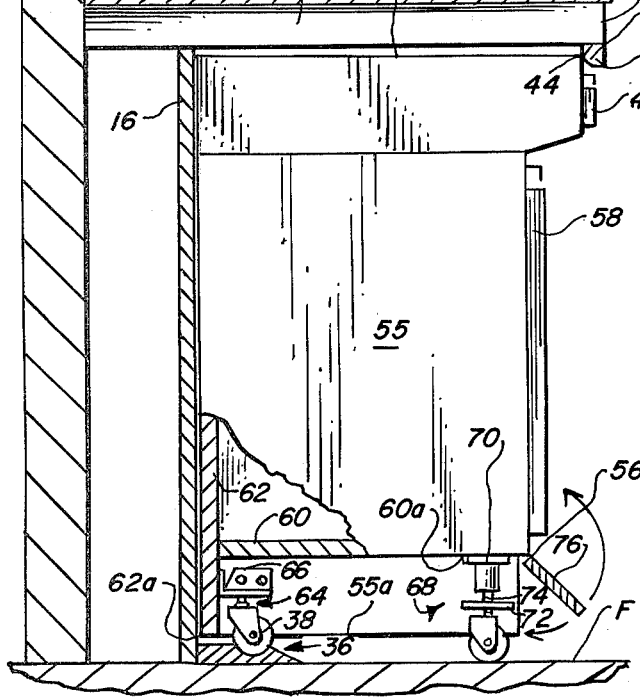
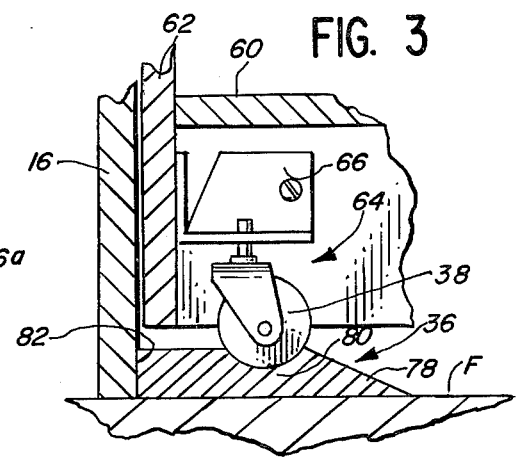

MODULAR FURNITURE SYSTEM

BACKGROUND OF THE INVENTION

This invention relates to mobile, modular furniture, and, more particularly, relates to means for releasably anchoring movable furniture cabinets for use typically in modular laboratory cabinet systems.

In the furniture industry, sectional and combination units have been employed to provide flexibility in use and conservation of floor space. As described in U.S. Pat. No. 3,900,905, wheeled furniture units have been developed which can employ ramped wheel stops for combination bed and lounge mattress units which are movable to alternative positions. Similar disclosure in U.S. Pat. No. 3,055,017 teaches a convertible bed structure in which a wheeled bed can be retracted to a position partially beneath a table and employ upwardly extending projections arranged to block movement of the wheel from the retracted position.

Modular furniture typically employed in industrial and educational scientific laboratories is constructed as separate mobile sections, such as wheeled cabinets, which provide individual work bench countertops for flexible arrangement of the units. Similar modular laboratory furniture is described in U.S. Pat. No. 3,356,434 which teaches that individual, wheeled laboratory cabinets placed for use in abutment with the wall of a utility bulkhead or other units can be immobilized by vertical adjustment, particularly using pawl and ratchet operated cams, to lift the support wheels of the unit from the floor and engage connectors formed on the modular unit and the abutment.

According to this invention, a structural arrangement for individual modular furniture units provides a continuous work bench or countertop for multiple units which eliminates interruptions in the work surface between adjoining units. The invention provides a structure which maintains the units in conveniently secured placement while allowing convenient release for rearrangement of the units.

BRIEF DESCRIPTION OF THE DRAWING

FIG. 1 is a front perspective view of a modular cabinet system assembled according to this invention and showing the releasably anchoring wheel mount having one cabinet installed and a second cabinet poised for installation in the system;

FIG. 2 is a vertical sectional view taken along the line 2—2 of FIG. 1;

FIG. 3 is an enlarged sectional view broken away from FIG. 2 showing an installed cabinet and rear caster wheel mounted in the depression seat of the wheel mount shown in FIG. 1.

SUMMARY OF THE INVENTION

The conveniently rearrangable modular furniture system according to this invention includes movable furniture modules such as mobile laboratory cabinets provided with wheel structures, typically conventional casters, supporting the rear portion of the cabinet for movement to install the cabinet underneath a work surface structure. The structure can provide extended and continuous countertop working surface for multiple cabinets. The rear caster wheels of each cabinet are releasably anchored in wheel mount seats formed as depressions, preferably a fixture providing a concave track to seat multiple wheels, anchoring them at a level elevated from the floor in the installed position. The modules or cabinet units can be further secured in the installed position by equipping the work surface structure with a retainer which releasably obstructs the cabinets against movement out of the installed position.

In a preferred embodiment of the assembled system, the cabinet modules are provided with vertically adjustable casters to elevate the forward portion of the cabinet, generally leveling the cabinet top and additionally moving the front edge of the cabinet top into firm engagement with a retainer bar projecting downward from the work surface structure.

DESCRIPTION OF THE PREFERRED EMBODIMENTS

Referring to FIG. 1 which depicts a typical laboratory equipped with a preferred arrangement of the modular furniture assembly according to this invention, work surface structure designated by general reference numeral 10 engages a wall W. Work surface structure 10 is formed by a substantially horizontal countertop 12 providing a generally elongate work surface which can include a rear-upstanding section 14 typically abutting either wall W or a conventional soffit 16 projecting from wall W, which houses conduits (not shown) for water, gas and similar service utilities.

Countertop 12 is seated on support structure 18 which is formed, for example, in rigid frame construction preferably from tubular metal, plastic or similar rigid material. As shown in FIG. 1, support structure 18 includes longitudinal beam 20 and cross beam(s) 22 which engage the countertop 12 below and slightly recessed from the longitudinal edge 24 and cross edge(s) 26 of the generally rectangular shaped countertop 12. Two or more upstanding strut supports 28 can be attached at upper ends 30 to cross beam 22 and can be attached at lower ends 32 to base beam 34 which rests upon a floor F or similar base surface.

In a preferred embodiment according to this invention as shown in FIG. 1, an elongate wheel mount structure 36 is positioned upon floor F and preferably extends substantially the entire length of countertop 12 between base beams 34 for anchoring installed rear caster wheels 38 of movable cabinets 40, as more fully described hereinafter in reference to FIGS. 2 and 3. As shown in FIG. 1, mobile furniture modules, such as the typical movable laboratory cabinets 40, can be dimensioned in height and depth to allow multiple such units to fit entirely beneath countertop 12.

The movable cabinets 40, having generally conventional construction, are provided with a substantially horizontal, preferably rectangular-shaped top 42 having a front edge 44 formed by the upper portion of vertical face panel 46. A typical drawer head 48 can project from face panel 46. A pair of side panels, one of which is shown at 50 depending from top 42 intersect front panel 46 with one corner shown at edge 52. The body of cabinet 40 is conventionally constructed to include sidewalls 54 and 55 generally in flush engagement below side panels 50, and front wall 56, which can be provided with a conventional projecting door 58. Cabinet bottom 60 is recessed above the bottom edges 54a and 55a of sidewalls 54 and 55 and preferably above the bottom edge 62a of backwall 62, as best shown in FIG. 2.

Cabinet 40 is provided with rear roller structure, preferably including a pair of conventional rear casters 64, each caster preferably attached to both backwall 62 and one of the sidewalls 54 or 55 respectively, by corner brackets 66 positioned below bottom 60. As shown in FIG. 2, the forward portion of cabinet 40 is preferably supported by a pair of conventional, vertically adjustable casters 68 each of which is attached to the underside of the forward portion 60a of cabinet bottom 60 by a flange 70. While rear castors 64 need not be vertically adjustable, front casters 68 are each preferably vertically adjustable by manually twisting adjustment disc 72 mounted on screw 74 which is retractable into flange 70. A hinged panel 76 is hinged to the bottom edge 56a of front wall 56 in normally vertical position to cover caster adjustment discs 72.

Multiple cabinets 40 can be conveniently installed in the releasably secured assembly depicted in FIG. 2, according to this invention. Cabinet 40 can be wheeled into the opening space under work surface structure 10 to a position in which rear caster wheels 38 are anchored in wheel mount structure 36, placing cabinet 40 and cabinet top 42 entirely beneath countertop 12. As best shown in FIG. 3, wheel mount structure 36 is constructed to provide a ramp 78 upwardly inclined from floor F for smooth ascent and entrance of rear caster wheels 38 into a depression seat 80, which anchors the wheels at a level elevated from floor F. Depression seat 80 can be formed to accommodate wheel 38 in a V-shape or similar notch, but is preferably formed as a curved or concave cavity in an elevated platform 82, which is integrally connected to ramp 78, as shown in FIG. 3. Preferably the concavity of depression seat 80 has approximately the same radius as wheel 38, in order to provide secure anchoring of the wheel while allowing smooth entry and exit or release of the wheel for rearrangement of cabinet 40. While wheel-mount structure can be formed as discrete seats for individual caster wheels, the wheel mount structure is preferably formed as the elongate, continuous wheel mount structure 36 as shown in FIG. 1, which allows depression seat 80 to provide a continuous concave track for accomodation of cylindrical rollers as well as multiple conventional caster wheels and for greatest flexibility in the longitudinal placement of cabinets 40.

In order to provide complete securement of cabinet 40 in the installed position anchoring rear caster wheels 38 in depression seat 80, work surface structure 10 is provided with an elongate retainer bar 84 to secure engagement with cabinet top 42. After rear caster wheels 38 are anchored into depression seat 80, hinged plate 76 is lifted to allow access to the adjustment disc 72 of each caster 68, which enable elevation of the forward portion of cabinet 40 thereby moving front edge 44 of cabinet top 42 into firm engagement with the rear surface 86 of retainer bar 84. While modifications to the retainer bar can be made for attachment to countertop 12, preferably retainer bar 84 is directly attached to vertically project from the bottom of longitudinal beam 20 along its entire length as shown in FIG. 1 in order to provide flexibility in longitudinal placement of cabinets 40. Retainer bar 84 can be easily fabricated and provides greater flexibility in placement of cabinets 44 than other locking structures which nevertheless can be employed as alternative means for preventing movement of the installed cabinets according to this invention.

Release of cabinet 40 from secured installation beneath work surface structure 10 can be conveniently accomplished by manual adjustment of disc 72 to lower and disengage cabinet front edge 44 from retainer bar 84, followed by pulling cabinet 40 to smoothly release rear caster wheels 38 from depression seat 80 for descent upon ramp 78 and removal of cabinet 40 from beneath work surface structure 10 for rearrangement.

I claim:
1. A modular furniture system for convenient rearrangeable assembly upon a floor comprising:
   (a) one or more movable furniture modules, each said module including:
      (1) a planar top end,
      (2) at least one rear roller means fixedly secured to a rear portion of said module for movement of said module upon said floor and movement vertically concurrently with said rear portion, and
      (3) adjustable support means secured to support a forward portion of said module upon said floor;
   (b) a work surface structure including a substantially horizontal countertop and support structure for said countertop providing an open space for moving said module into an installed position in which said module is entirely beneath said countertop;
   (c) means automatically engaging said rear roller means, including a depression for receiving said rear roller means, and elevating the rear roller means and said rear portion of said module, relative to the floor, upon a rearward movement of said module into an installed position beneath said countertop, said adjustable support means being adjustable to elevate the forward portion of said module, when said module is located in said installed position, to correspond to the elevated level of the rear portion to substantially level and planar top end relative to the floor; and
   (d) said work surface structure including a retainer depending from said countertop forward of the module in the installed position thereof, said retainer depending to an elevation generally between the heights of the top end prior to and subsequent to the elevation of the module whereby the module, prior to elevation, is free to move beneath the retainer into the installed position for elevation therein, said module when elevated, being precluded from outward movement by said retainer.

2. A system according to claim 1 wherein said adjustable support means comprises at least one vertically adjustable roller means for elevation of said forward portion of said module.

3. A modular furniture system for convenient rearrangeable assembly upon a floor comprising:
   (a) one or more movable furniture modules, each said module including:
      (1) at least one rear roller means positioned to support a rear portion of said module for movement of said module upon said floor, and
      (2) support means positioned to support a forward portion of said module upon said floor;
   (b) a work surface structure including a substantially horizontal countertop and support structure for said countertop providing an open space for moving said module into an installed position in which said module is entirely beneath said countertop, said work surface including retaining means to prevent the module from outward movement when installed; and
   (c) a roller mount structure including a depression seat for receiving and releasably anchoring said rear roller means at a level elevated from said floor when said module is located in said installed position, said roller mount structure including a ramp member upwardly inclined from said floor for providing ascent of said rear roller means into said depression seat, said depression seat being formed as a concave cavity in said roller mount structure, said roller mount structure further including an elongate elevated platform having said concave cavity formed as a continuous concave track therein.

* * * * *

UNITED STATES PATENT AND TRADEMARK OFFICE
CERTIFICATE OF CORRECTION

PATENT NO. : 4,337,988

DATED : July 6, 1982

INVENTOR(S) : Robert Schenck

It is certified that error appears in the above-identified patent and that said Letters Patent is hereby corrected as shown below:

In the drawings, Sheet 1, Fig. 1 reference numeral "-5b-" of the side panel should read --50--. In Fig. 2, reference numeral "-55-" of the sidewall should read --54-- and reference numeral 55 should be applied to the opposite sidewall. In Fig. 2 the breakaway of sidewall 54 should be extended to completely expose cross section of bottom 60

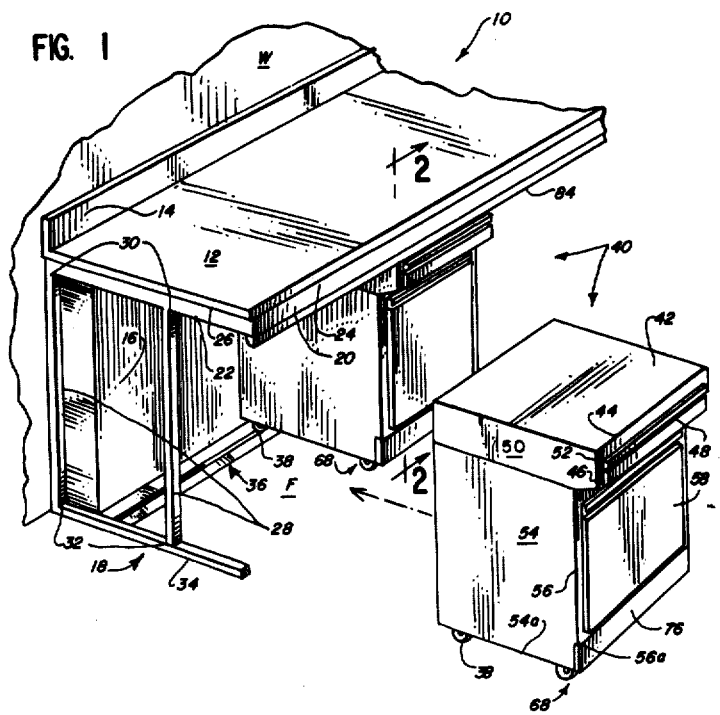

UNITED STATES PATENT AND TRADEMARK OFFICE
CERTIFICATE OF CORRECTION

Page 2 of 2

PATENT NO. : 4,337,988

DATED : July 6, 1982

INVENTOR(S) : Robert Schenck

It is certified that error appears in the above-identified patent and that said Letters Patent is hereby corrected as shown below:

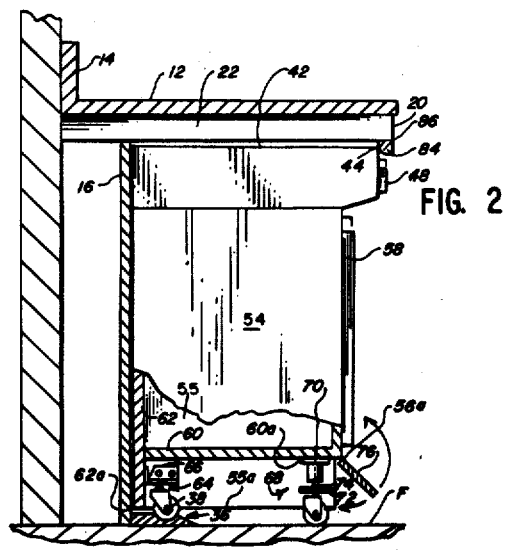

FIG. 2

Signed and Sealed this

Fifteenth Day of February 1983

[SEAL]

Attest:

Attesting Officer

GERALD J. MOSSINGHOFF

Commissioner of Patents and Trademarks